United States Patent [19]

Nelson

[11]  4,167,542
[45]  Sep. 11, 1979

[54] POLYESTER RESIN COMPOSITIONS CONTAINING DICYCLOPENTADIENE ALKENOATE

[75] Inventor: Donald L. Nelson, Lake Jackson, Tex.

[73] Assignee: The Dow Chemical Company, Midland, Mich.

[21] Appl. No.: 953,678

[22] Filed: Oct. 23, 1978

Related U.S. Application Data

[63] Continuation-in-part of Ser. No. 814,359, Jul. 11, 1977, abandoned.

[51] Int. Cl.$^2$ .............................................. C08L 67/06
[52] U.S. Cl. ................................ 525/445; 260/40 R; 428/290; 428/431
[58] Field of Search ...................... 260/40 R, 871, 872

[56] References Cited

U.S. PATENT DOCUMENTS

| 3,347,806 | 10/1961 | Zimmerman | 260/22 |
| 3,553,294 | 7/1967 | McGary, Jr. et al. | 260/871 |
| 3,883,612 | 5/1975 | Pratt et al. | 260/862 |
| 3,933,757 | 1/1976 | Pratt et al. | 260/75 A |
| 4,029,848 | 6/1977 | Nelson | 428/430 |

Primary Examiner—Richard B. Turer
Attorney, Agent, or Firm—B. G. Colley

[57] ABSTRACT

Thermosetting resin compositions containing unsaturated polyester resins which have been modified with a dicyclopentadiene. The polyester resins are blended with a mixture of vinyl aromatic monomers and dicyclopentadiene alkenoate. The resin compositions are useful to make fibrous reinforcement laminates. The use of the dicyclopentadiene alkenoate accelerates the rate at which hardness develops during room temperature cure.

8 Claims, No Drawings

POLYESTER RESIN COMPOSITIONS CONTAINING DICYCLOPENTADIENE ALKENOATE

CROSS REFERENCE TO RELATED APPLICATIONS

This is a continuation-in-part of Ser. No. 814,359 filed July 11, 1977, now abandoned.

BACKGROUND OF THE INVENTION

This invention relates to a thermosetting resin composition containing unsaturated polyester resins modified with a dicyclopentadiene concentrate, a vinyl aromatic monomer, and a dicyclopentadiene alkenoate and laminates prepared from them. More specifically, the invention relates to compositions containing polyester resins produced by reacting a glycol, an olefinically unsaturated dicarboxylic acid or anhydride, a saturated dicarboxylic acid or anhydride, and 10 to 100 mole percent based on the acid of a dicyclopentadiene concentrate. These polyester resins are blended with styrene and dicyclopentadiene acrylate to produce a thermosetting resin composition or blend.

It is well known from the report by P. L. Smith, et al. "The Use of Dicyclopentadiene in Polyesters", Proceedings of the 22nd Annual Technical Conference, S.P.I., Reinforced Plastics Division, Washington, D.C. (1967) and the article by R. Zimmermann, et al. "Modification of Unsaturated Polyesters with Dicyclopentadiene" Qette-Serfen-Anstrichmittel 66, #9, 670–678 (1964), and U.S. Pat. No. 3,347,806 that polyesters can be modified with dicyclopentadiene.

The use of a low purity dicyclopentadiene concentrate to make polyester resins is disclosed in U.S. Pat. No. 4,029,848 dated June 14, 1977.

SUMMARY OF THE INVENTION

It now has been found that a thermosetting resin composition can be prepared using a linear unsaturated polyester containing dicyclopentadiene and about 20 to about 70% by weight of an unsaturated monomer mixture of a vinyl aromatic monomer and a dicyclopentadiene alkenoate. An advantage of this invention is that the use of the dicyclopentadiene alkenote accelerates the rate at which hardness develops during the room temperature cure of the resins. Additional benefits are that less monomer is lost to the atmosphere during curing and the amount of smoke generated during burning is less when the composition of this invention is used.

The thermosetting resin composition of this invention comprises (A) about 80 to about 30% by weight of a linear unsaturated polyester containing 10 to 100 mole percent of a dicyclopentadiene concentrate based on the moles of dicarboxylic acid or anhydride contained in said polyester, (B) about 20 to about 70% by weight of an unsaturated monomer mixture of a vinyl aromatic monomer and a dicyclopentadiene alkenoate wherein the range of dicyclopentadiene alkenoate in said mixture ranges from about 5 to about 90 weight percent.

A related aspect of this invention is the fibrous reinforcement laminate which has been impregnated and cured with the above composition.

DESCRIPTION OF THE PREFERRED EMBODIMENTS

The glycols used to prepare the polyesters of this invention are those which are reactive with acids and/or anhydrides and may include, for example, ethylene glycol, propylene glycol, diethylene glycol, dipropylene glycol, butanediol, hexanediol, pentaceythritol, triethylene glycol, trimethylol propane, glycerol, or mixtures thereof. Preferably, the glycols used in this invention are propylene glycol and/or dipropylene glycol as the major glycol component.

The unsaturated dicarboxylic acids or anhydrides that can be used include maleic, fumaric, mesaconic, itaconic, citracomic and the like or mixtures thereof.

Conventional saturated dibasic acids useful to prepare these polyesters include, for example, orthophthalic anhydride or acid, terephthalic acid, isophthalic acid, adipic acid, sebacic acid, succinic acid and the like acids or anhydrides.

The dicyclopentadiene concentrate used in this invention is a commercial product generally prepared by dimerizing a crude $C_5$ stream from the cracking of crude mixtures of hydrocarbons as set forth by Gebhart, et al. in U.S. Pat. No. 3,557,239.

These dicyclopentadiene concentrates can have about 70 to about 90 percent by weight of dicyclopentadiene, about 4.0 to about 15.0 percent by weight of $C_{10}$ dimers, about 1.0 to about 7.0 percent by weight of $C_{15}$ trimers of cyclopentadiene with the remainder being aliphatic diolefins such as piperylene, isoprene, 1,5-hexadiene, cyclic olefins such as cyclopentadiene, cyclopentene and the like.

Examples of the $C_{10}$ dimers which have been identified in these concentrates are the Diels-Alder adducts of two moles of isoprene (isoprene dimers), the adduct of cyclopentadiene and isoprene, the adduct of cyclopentadiene and piperylene, and the like.

Examples of the $C_{15}$ trimers which have been identified are the Diels-Alder adducts of three moles of cyclopentadiene, the adducts of two moles cyclopentadiene with one mole of isoprene, the adducts of two moles of isoprene with one mole of cyclopentadiene, and the like.

The above dicyclopentadiene concentrate can also be used in the relatively pure form of about 91 to about 99 percent dicyclopentadiene. The amount of $C_{10}$ and $C_{15}$ dimers and trimers is, of course, correspondingly less in these more pure forms.

The polyesters are prepared by reacting about one mole each of the unsaturated acid or anhydride and the saturated acid or anhydride with about 2.0 to about 2.3 moles of the above glycols and with about 0.05 to about 0.375 moles ofthe dicyclopentadiene concentrate per mole of the unsaturated acid or anhydride.

The above components are charged to a reactor and heated to a temperature in the range of from about 120° to about 160° C. and preferably from about 130° to about 150° C. under reflux in a nitrogen atmosphere for a period of time ranging from about 1.0 to about 2 hours.

After this initial reaction or reflux, the reaction is heated to about 180° to about 220° C. and preferably 190° to 205° C. with a removal of the water of condensation by a Dean Stark trap until the acid number reaches about 30 to about 35.

The resin is then recovered and blended with an ethylenically unsaturated monomer mixture copolymerizable with the unsaturated polyester polymers. The mixture comprises vinyl aromatic monomers such as styrene, methyl styrene, chlorostyrene, vinyl toluene, divinyl benzene, and diallyl phthalate with about 5 to about 90 weight percent to dicyclopentadiene alkenoate.

These polyester blends with the unsaturated monomer mixture should contain 20 to about 70 percent by weight and preferably 30 to 50 percent by weight of the monomer mixture based on the weight of the polyester. A small amount of an inhibitor such as tertiary butyl catechol, hydroquinone, or the like is added to this mixture. The amount added is generally in the range from about 50-300 parts per million based on the amount of unsaturated monomer.

The final blend is a crosslinkable polyester composition which is useful to make laminates.

The dicyclopentadiene alkenoate used herein are made by the acid catalyzed reaction of a commercial $C_{10}$–$C_{12}$ hydrocarbon stream containing at least 50% dicyclopentadiene with an alkenoic acid such as acrylic acid. The process is known from British Pat. No. 1,114,585.

While it is preferred to use acrylic acid in this process, other monocarboxylic alkenoic acids having 3–5 carbon atoms can be used such as methacrylic acid, crotonic acid, isocrotonic acid, angelic acid, tiglic acid, and mixtures thereof.

The laminates are made by mixing into the crosslinkable composition free radical forming catalysts and adding this mixture to a suitable fibrous substrate such as asbestos fibers, carbon fibers, fibrous glass, or inorganic fibers. Exampls of these catalysts are benzoyl peroxide, tertial butyl peroxide, methylethylketone peroxide and the like. It is also of value to add accelerators such as cobalt naphthenate, dimethyl aniline, and the like.

The polyester resin is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The following examples are presented to illustrate but not limit the invention.

EXAMPLES 1 AND 2

A polyester containing the following ingredients was prepared.

245.15 gms (2.5 moles) maleic anhydride
370.30 gms (2.5 moles) phthalic anhydride
399.50 gms (5.25 moles) propylene glycol
12.13 gms (0.1 moles) oxalic acid
198.43 gms (1.5 moles) of $C_{10}$ hydrocarbon mixture containing 83.15% dicyclopentadiene with the remainder being mainly codimers of cyclopentadiene and other conjugated $C_5$ dienes.

The polyester was cooked to an acid number of 33. 100 ppm of hydroquinone was added to the resin and it was poured and rapidly cooled.

The polyester was then blended at a 50% monomer level with: (a) all styrene as the monomer (Control A), (b) a 1:1 weight percent blend of styrene and dicyclopentadiene acrylate as the monomer (Example 1) and (c) a 3:1 blend of styrene and dicyclopentadiene acrylate as the monomer (Example 2). Table I describes the properties of these resin systems.

TABLE I

RESIN PROPERTIES

| Example | % Resin | % Styrene | % DCOD A[6] | ppm inhibitor MeHQ[1] | TBC[2] | HQ[3] | 24° C. Viscosity cps | Room Temp[4] Gel Time (min.) | 180° F. PSI Gel Time[5] Gel Time (Min.) | Cure Time (min.) | Max Exotherm (°F.) |
|---|---|---|---|---|---|---|---|---|---|---|---|
| Con A | 50 | 50 | 0 | 113 | 12 | 100 | 39.5 | 9.5 | 6.5 | 10.7 | 346 |
| Ex 1 | 50 | 25 | 25 | 119 | 6 | 100 | 155.0 | 13.5 | 7.7 | 10.7 | 340 |
| Ex 2 | 50 | 37.5 | 12.5 | 122 | 3 | 100 | 57.5 | 10.7 | 6.5 | 11.2 | 349 |

[1] methyl hydroquinone
[2] p-tert-butyl catechol
[3] hydroquinone
[4] system is 1.0% Lupersol DDM 0.1% cobalt naphthenate 6%, 0.1% dimethyl aniline
[5] uses 1% benzyl peroxide
[6] dicyclopentadiene acrylate made from the reaction of one mole of acrylic acid with one mole of dicyclopentadiene in the presence of $BF_3$ as the catalyst

EXAMPLES 3 AND 4

Glass laminates, containing 25% random fiber glass mat, were prepared using the resin blends in Table I. Two fiber glass plys and a normal hand-roller technique were used to make a part about ⅛-inch thick and 12" by 14" in dimensions from each resin blend. Table II describes the catalysts used with the resin blends so that the gel time would be about 15 to 18 minutes.

TABLE II

CATALYST SYSTEMS

| Examples | % Lupersol DDM[R] | % Cobalt Naphthenate 6% | % dimethyl aniline | Room Temp. minutes Gel Time |
|---|---|---|---|---|
| Control B (Control A blend) | 1.0 | 0.067 | 0.033 | 17.6 |
| Example 3 (Example 1 blend) | 1.0 | 0.10 | 0.06 | 15.4 |
| Example 4 (Example 2 blend) | 1.0 | 0.067 | 0.067 | 16.3 |

Period meansurements were made to observe the amount of monomer lost and the rate at which hardness developed. Barcol and Shore D hardness testers were used. Monomer loss was determined by measuring the change in laminate weight. Table III presents the monomer loss data expressed as a percent of the monomer in the laminate.

TABLE III

MONOMER LOSS

| Time | Control B % monomer loss | Example 3 % monomer loss | Example 4 % monomer loss |
|---|---|---|---|
| 15 min | 2.2 | 1.2 | 2.3 |
| 30 min | 4.4 | 2.6 | 4.3 |
| 45 min | 6.7 | 3.2 | 5.5 |
| 1 hour | 8.1 | 3.2 | 6.3 |
| 2 hours | 9.2 | 3.2 | 6.4 |
| 4 hours | 9.3 | 3.2 | 6.4 |

Table III shows that the amount of monomer lost is inversely proportional to the amount of dicyclopentadiene acrylate.

TABLE IV

LAMINATE HARDNESS DEVELOPMENT

| | Control B | | Example 3 | | Example 4 | |
|---|---|---|---|---|---|---|
| Time | S | B | S | B | S | B |
| 2 hrs. | 35 | 0 | 70 | 0 | 65 | 0 |
| 3 hrs. | 48 | 0 | 72 | 0 | 75 | 0 |
| 4 hrs. | 65 | 0 | 74 | 1 | 76 | 5 |
| 5 hrs. | 76 | 0 | 75 | 5 | 78 | 10 |
| 6 hrs. | 76 | 12 | 76 | 10 | 80 | 15 |
| 7 hrs. | 76 | 15 | 77 | 20 | 80 | 21 |

S is Shore D hardness
B is Barcol hardness

Table IV shows that the hardness value vs. time is consistently higher for the dicyclopentadiene acrylate containing resins.

The physical strengths of the above laminates were tested in accordance with ASTM D-790 for flexural strengths and ASTM D-638 for tensile strengths. The results, without any post cure, provide for acceptable strength levels in all cases. Table V presents the physical properties.

TABLE V

PHYSICAL PROPERTIES OF CURED LAMINATES

| Example | Flex Strength (psi) | Flex Modulus psi × $10^3$ | Tensile Strength (psi) | Tensile Modulus psi × $10^3$ | percent Elongation |
|---|---|---|---|---|---|
| Control B | 18,400 | 670.0 | 12,159 | 698.1 | 2.01 |
| Example 3 | 18,494 | 761.9 | 11,67 | 1,036.4 | 1.24 |
| Example 4 | 17,246 | 658.8 | 11,681 | 696.1 | 2.00 |

I claim:

1. A thermosetting resin composition which comprises
   (A) about 80 to about 30% by weight of a linear unsaturated polyester containing 10 to 100 mole percent of a dicyclopentadiene concentrate based on the moles of dicarboxylic acid or anhydride contained in said polyester,
   (B) about 20 to about 70% by weight of an unsaturated monomer mixture of a vinyl aromatic monomer and a dicyclopentadiene alkenoate wherein the range of dicyclopentadiene alkenoate in said mixture ranges from about 5 to about 90 weight percent.

2. The resin composition of claim 1 wherein the unsaturated polyester is prepared by the reaction under resin forming conditions of:
   (A) a glycol,
   (B) an olefinically unsaturated dicarboxylic acid or the anhydride thereof or mixtures thereof, and
   (C) 10 to 100 mole percent of a dicyclopentadiene concentrate based on the moles of dicarboxylic acid or anhydride.

3. The resin composition of claim 1 wherein the unsaturated polyester is prepared by the reaction of
   (A) a glycol,
   (B) an olefinically unsaturated dicarboxylic acid or the anhydride thereof or mixtures thereof,
   (C) a saturated dicarboxylic acid or the anhydride thereof or mixtures thereof or mixtures of (B) and (C), and
   (D) 10 to 100 mole percent of a dicyclopentadiene concentrate based on the moles of dicarboxylic acid or anhydride.

4. The resin composition of claim 1 wherein the dicyclopentadiene alkenoate is dicyclopentadiene acrylate.

5. A cured fibrous laminate made with the composition of claim 1.

6. A cured fibrous laminate made with the composition of claim 2.

7. A cured fibrous laminate made with the composition of claim 3.

8. A cured fibrous laminate made with the composition of claim 4.

UNITED STATES PATENT AND TRADEMARK OFFICE
CERTIFICATE OF CORRECTION

PATENT NO. : 4,167,542
DATED : September 11, 1979
INVENTOR(S) : Donald L. Nelson It is certified that error appears in the above-identified patent and that said Letters Patent are hereby corrected as shown below:

Column 1, line 47, change "alkenote" to --alkenoate--.

Column 3, line 5, change "to" to --of--.

In Table I, on Title line, change "DCOD" to --DCPD--.

Column 3, line 50, change "Exampls" to --Examples--.

In Table IV, across from the Time of 5 hrs., under Example 3, Col. B, change "5 78" to --5--; under Example 4, Col. S, change "10" to --78--; and Col. B, add --10--.

Signed and Sealed this

Thirtieth Day of December 1980

[SEAL]

Attest:

SIDNEY A. DIAMOND

Attesting Officer

Commissioner of Patents and Trademarks